(12) United States Patent
Scheuchl et al.

(10) Patent No.: US 11,146,151 B2
(45) Date of Patent: Oct. 12, 2021

(54) BRUSH MODULE

(71) Applicant: SCHUNK CARBON TECHNOLOGY GMBH, Bad Goisern (AT)

(72) Inventors: Mario Scheuchl, Bad Goisern (AT); Markus Weber, Bad Goisern (AT)

(73) Assignee: SCHUNK CARBON TECHNOLOGY GMBH, Bad Goisern (AT)

( * ) Notice: Subject to any disclaimer, the term of this patent is extended or adjusted under 35 U.S.C. 154(b) by 101 days.

(21) Appl. No.: 16/484,561

(22) PCT Filed: Jan. 26, 2018

(86) PCT No.: PCT/EP2018/051914
§ 371 (c)(1),
(2) Date: Aug. 8, 2019

(87) PCT Pub. No.: WO2018/149615
PCT Pub. Date: Aug. 23, 2018

(65) Prior Publication Data
US 2019/0363617 A1 Nov. 28, 2019

(30) Foreign Application Priority Data
Feb. 16, 2017 (DE) .................. 10 2017 202 549.2

(51) Int. Cl.
*H02K 5/14* (2006.01)
*H01R 39/38* (2006.01)
(Continued)

(52) U.S. Cl.
CPC .......... *H02K 13/003* (2013.01); *H01R 39/38* (2013.01); *H02K 5/141* (2013.01); *H02K 19/00* (2013.01)

(58) Field of Classification Search
CPC .......... H02K 13/00; H02K 19/00; H02K 5/14; H02K 5/141; H02K 13/003; H02K 23/18;
(Continued)

(56) References Cited

U.S. PATENT DOCUMENTS 6,294,856 B1    9/2001 Ishida et al.
6,417,595 B1 *  7/2002 Wasson .................. H02K 5/10
                                                310/220
(Continued)

FOREIGN PATENT DOCUMENTS

CN    205004865 U    1/2016
DE    10155221 A1    5/2003
(Continued)

OTHER PUBLICATIONS

English Abstract Translation of CN205004865 dated Jan. 27, 2016.
(Continued)

*Primary Examiner* — Tran N Nguyen
*Assistant Examiner* — Leda T Pham
(74) *Attorney, Agent, or Firm* — Dickinson Wright PLLC; Andrew D. Dorisio

(57) ABSTRACT

The invention relates to a brush module (10) for a rotating electric machine, in particular for a current-excited synchronous machine, the brush module (10) having at least two brushes (12) for establishing electrical contact with slip rings (11) of the machine, the brush module (10) having a housing device (13) and brush holders (14) for accommodating and supporting the brushes (12), wherein the housing device (13) has a collecting device (21) for collecting brush dust of the brushes (12). Alternatively, the housing device (13) is configured in such a manner that the brush holders (14) are spaced apart from each other, the housing device
(Continued)

(13) at least partially forming an air gap between the brush holders (14) on a housing portion of the housing device (13) that faces slip rings (11).

14 Claims, 2 Drawing Sheets

(51) Int. Cl.
*H02K 13/00* (2006.01)
*H02K 19/00* (2006.01)

(58) Field of Classification Search
CPC .......... H02K 5/148; H02K 9/28; H01R 39/46; H01R 39/48
See application file for complete search history.

(56) References Cited

U.S. PATENT DOCUMENTS

| | | | |
|---|---|---|---|
| 6,486,580 | B1 | 11/2002 | Cenzer et al. |
| 7,102,266 | B2 * | 9/2006 | Coles ........................ H02K 5/10 |
| | | | 310/220 |
| 7,573,174 | B2 * | 8/2009 | Braml .................... H01R 39/48 |
| | | | 310/239 |
| 2008/0030098 | A1 * | 2/2008 | Shawcross ............. H01R 39/46 |
| | | | 310/239 |
| 2008/0061652 | A1 * | 3/2008 | Yamamuro .............. H02K 9/28 |
| | | | 310/228 |
| 2015/0357780 | A1 * | 12/2015 | Steinbach .............. H01R 43/14 |
| | | | 310/68 B |

FOREIGN PATENT DOCUMENTS

| | | |
|---|---|---|
| DE | 69912035 T2 | 8/2004 |
| DE | 102012203098 A1 | 4/2013 |
| EP | 1551094 A1 | 7/2005 |
| JP | S576372 A | 1/1982 |
| JP | S5814907 A | 1/1983 |
| JP | S62193532 A | 8/1987 |
| JP | H0556605 A | 3/1993 |
| JP | 5139223 A | 6/1993 |
| JP | 2002125343 A | 4/2002 |
| JP | 2007097236 A | 4/2007 |
| JP | 2008042993 A | 2/2008 |
| JP | 2009095153 A | 4/2009 |
| JP | 2012222843 A | 11/2012 |
| JP | 2017005934 A | 1/2017 |
| KR | 100178156 B1 | 5/1999 |
| KR | 20000056032 A | 9/2000 |
| WO | 2016009824 A1 | 1/2016 |

OTHER PUBLICATIONS

English Abstract Translation of JP2009095153A dated Apr. 30, 2009.
English Abstract Translation of KR20000056032A dated Sep. 15, 2000.
English Abstract Translation of JP2017005934A dated Jan. 5, 2017.
English Abstract Translation of JP2008042993A dated Feb. 21, 2008.
English Abstract Translation of JP2007097236 dated Apr. 12, 2007.
English Abstract Translation of JP2002125343 dated Apr. 26, 2002.
English Translation of KR100178156B1 dated May 15, 1999.
English Machine Translation of DE10155221A1 dated May 22, 2003.
English Machine Translation of DE102012203098A1 dated Apr. 4, 2013.
English Machine Translation of DE69912035T2 dated Aug. 26, 2004.
English Machine Translation of JP2012222843A dated Nov. 12, 2012.
English Machine Translation of JP5139223A dated Jun. 8, 1993.

* cited by examiner

Fig. 1
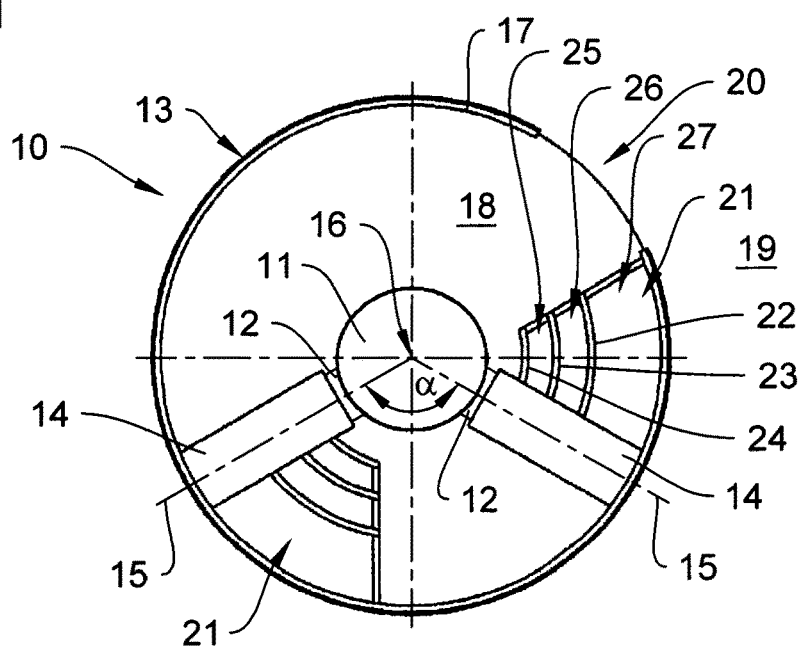
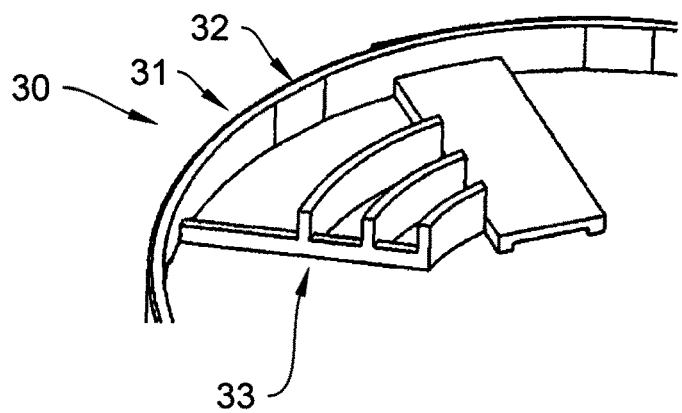
Fig. 2
Fig. 3
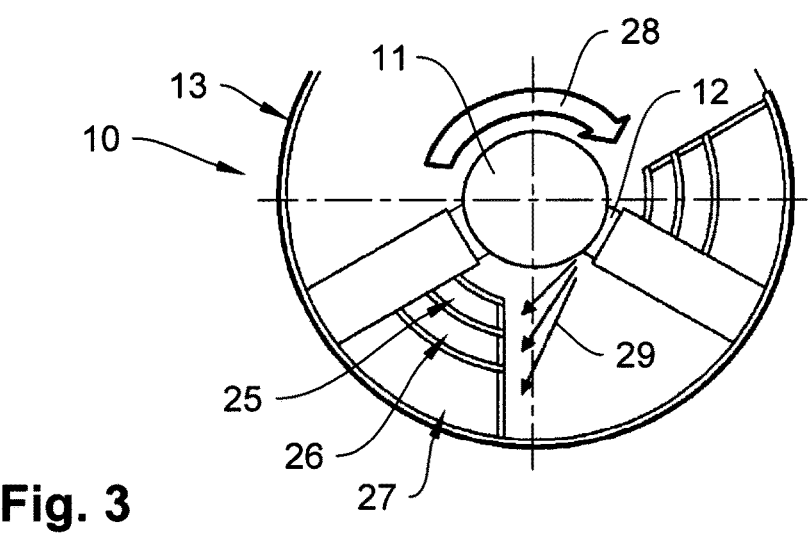

Fig. 4
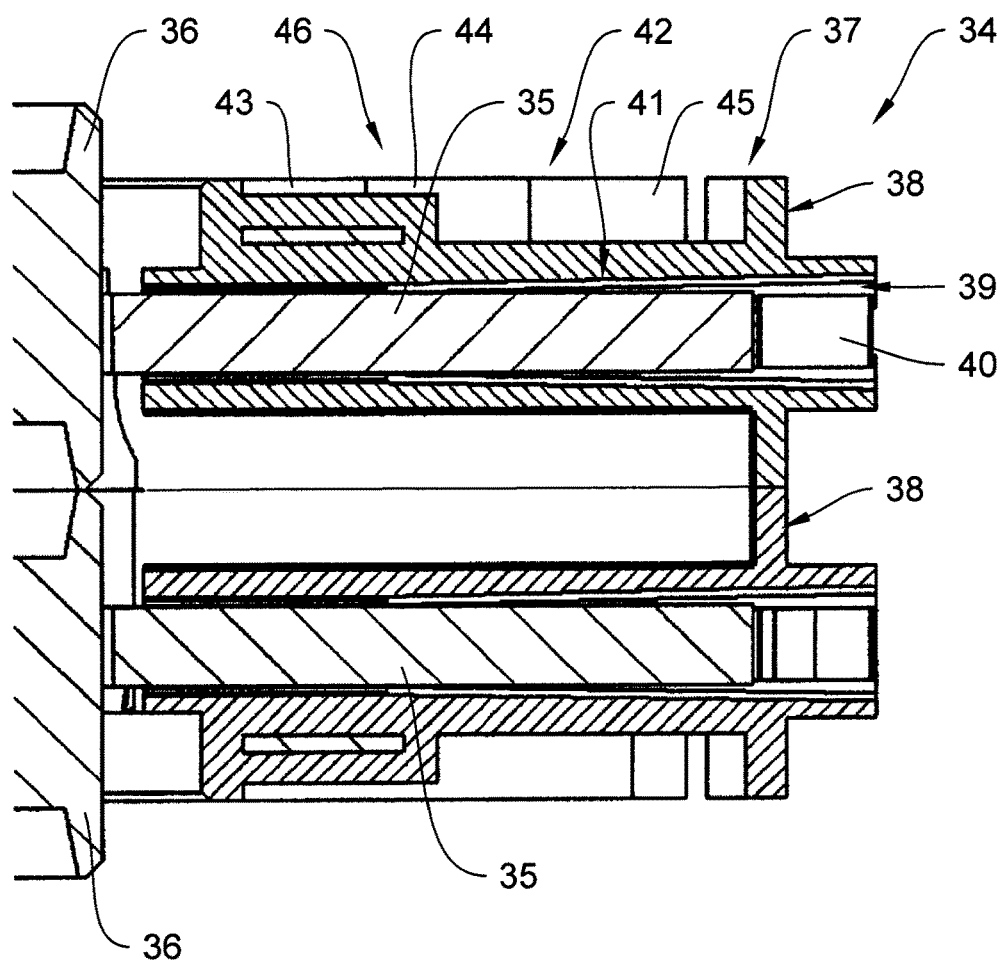
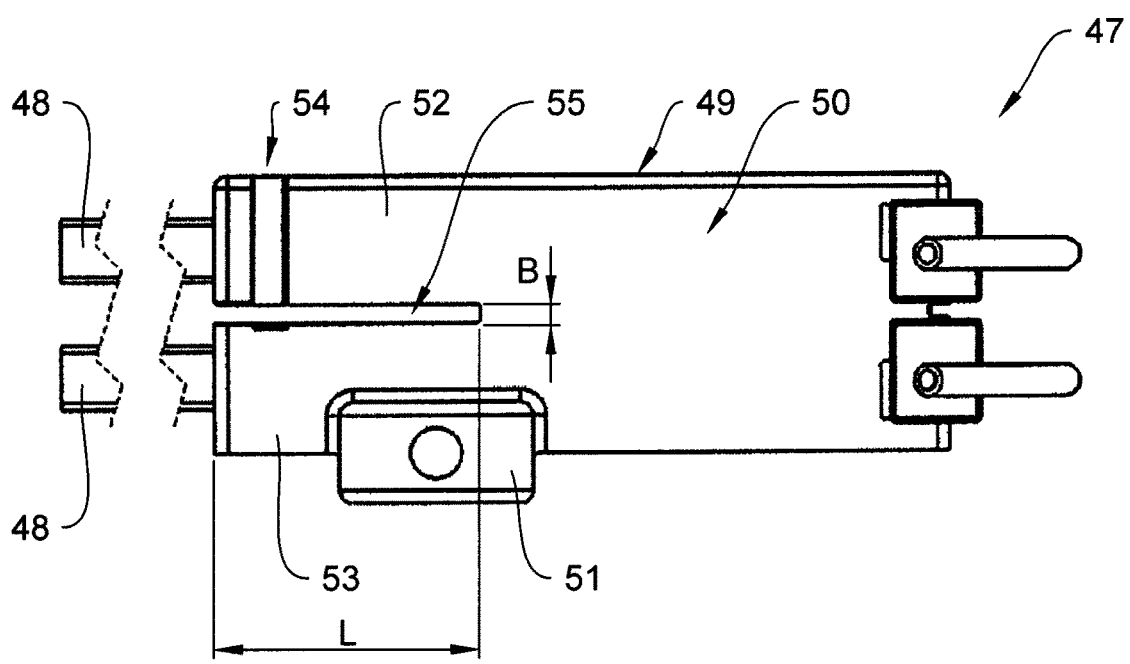
Fig. 5 ically used to transmit power to a rotating shaft of a
BRUSH MODULE

FIELD OF THE INVENTION

The invention relates to a brush module for a rotating electric machine and to an electric machine, in particular a current-excited synchronous machine, the brush module having at least two brushes for establishing electrical contact with slip rings of the machine, the brush module having a housing device and brush holders for accommodating and supporting the brushes.

BACKGROUND OF THE INVENTION

Brush modules of this kind are commonly known and are typically used to transmit power to a rotating shaft of a current-excited synchronous machine. Slip rings which are in electrical contact with the brushes of the brush module are disposed on the shaft. The brushes are accommodated in brush holders or in what is referred to as brush quivers in such a manner that they are mobile in the radial direction relative to the shaft; a spring exerts a spring force on the brushes, pushing them against the slip rings. Since the brush module has at least two brushes, the brush module can establish electrical contact with two slip rings, which may be polarized differently, for example. The brushes themselves are typically made of carbon or graphite with metallic fractions, if applicable, and are supplied with power via a stranded wire.

During operation of the electric machine, the material of the brushes is continuously worn, which means that the brushes are continuously consumed and diminish in length. The abraded particles enter the environment of the brush module and deposit there in the form of brush dust or graphite dust.

Disadvantageously, the brush dust forms a conductive dust surface which, in turn, forms what is known as a leakage path for electrical charges. For instance, the brush dust may form a leakage path between a metallic component of the electric machine and a brush or a brush holder (ground fault). Furthermore, a leakage path may be formed between two poles or brushes or brush holders (short circuit). In the event of a ground fault, voltages are transmitted to conductive parts of the electric machine or to the environment of the electric machine and, in the event of a short circuit, between the electric poles, which causes a malfunction of the electric machine and/or of power electronics required for driving said machine. While it is known in connection with current-excited synchronous machines for electrical energy to also be transmitted to a rotor without physical contact, such as by inductive coupling, these systems are significantly more expensive than brush modules because of their technical complexity.

Therefore, the object of the present invention is to propose a brush module or an electrical machine comprising a brush module that avoids the formation of leakage paths.

SUMMARY OF THE INVENTION

This object is attained by a brush module having the features of claim 1, by a brush module having the features of claim 13 and by an electric machine having the features of claim 18.

The brush module according to the invention for a rotating electric machine, in particular for a current-excited synchronous machine, has at least two brushes for establishing electrical contact with slip rings of the machine, the brush module having a housing device and brush holders for accommodating and supporting the brushes, wherein the housing device has a collecting device for collecting brush dust of the brushes.

In particular, the brush module is configured in such a manner that not only are the brush holders disposed on the respective slip rings, but the housing device also accommodates and supports the brushes or the brush holders. Hence, the at least two brushes are supported on the housing device together. According to the invention, the housing device has a collecting device for the brush dust of the brushes. The collecting device is configured in such a manner that the brush dust abraded from the brushes and, if applicable, particles abraded from the slip rings during operation of the electrical machine or rotation of the slip rings enter the collecting device. Accordingly, the brush dust is absorbed by the collecting device or at least a major part thereof is collected and stored in a controlled manner. In this way, larger amounts of brush dust can be prevented from depositing in the area of the brushes or brush holders in such a manner that an electrical leakage path would form between the brushes or brush holders or other electrically conductive parts of the electric machine or an environment. Overall, potential malfunction of the electric machine due to wear of the brushes can be effectively prevented in this way.

The housing device can fully surround at least the brushes, preferably the brushes and the brush holders. If the housing device is configured in such a manner that the brushes or an end of the brushes that is in electrical contact with the slip rings is housed by the housing device, brush dust can be prevented from entering an environment of the brushes outside of the housing device. In this case, the collecting device can be integrated within the housing device. Also, each brush may be assigned its own collecting device. In principle, the collecting device can be separate from the housing device and inserted into the housing. Alternatively, the collecting device can be formed by the housing device. The housing device can also be configured in such a manner that it fully surrounds the brush holders in addition to the brushes so that an undesired escape of brush dust is prevented. Furthermore, the housing device may only partially surround the brush holders.

The housing device can be configured to partially, preferably fully, surround slip rings coaxially. For instance, the housing device may have the shape of a circular ring segment or may be adapted to a circular shape of the shaft. The housing device may also be configured in the manner of a fully circular ring and may fully surround the slip rings in the radial direction.

So the housing device may be sealed in a dustproof or largely dustproof manner against an environment. In this way, brush dust can be prevented from escaping from the housing device into an environment of the slip rings and, thus, from potentially forming a leakage path toward other electrically conductive components of the electric machine. A substantially dustproof sealing against a rotating shaft can be achieved using a labyrinth seal, a sealing lip, a brush seal or other suitable seals, for example. Still, air exchange between the environment and an interior of the housing device may be provided, such as for cooling purposes.

The collecting device can have pockets for collecting brush dust, and the pockets may be disposed downstream of the brush in a direction of rotation of a slip ring. Brush dust abraded from the brushes will typically be transported in the direction of rotation of the slip ring, which is why pockets or pocket-shaped recess in which said brush dust can be collected may be disposed downstream of the brushes. The pockets can be formed by the housing device or also separate therefrom. With the brush dust being collected in the pockets, the dust can deposit in the pockets in a controlled manner without a leakage path being formed.

The pockets can be formed by ribs extending in the direction of rotation. The ribs can extend coaxially to the slip rings, the ribs providing a particularly large surface for adherence of the brush dust. The ribs can be formed by the housing device or can be inserted into the housing device.

Furthermore, the collecting device can have a material that absorbs brush dust. Said material can be a porous or air-permeable material, such as a textile material, in particular a non-woven fabric. A non-woven fabric can take in or absorb a large amount of brush dust in such a manner that the brush dust cannot easily detach from the non-woven fabric. This ensures that the brush dust cannot be released again by the collecting device, such as due to vibrations. The absorbent material can be disposed in or on pockets of the collecting device or on a wall of the housing device. Furthermore, the absorbent material may be exchangeable for cleaning purposes.

The housing device can be composed of two circular ring-shaped housing halves. The circular ring-shaped housing halves can be intermateable or also rotatable against each other in the radial direction. When the housing halves are of an identical design, they are particularly cost-effective to produce. Optionally, it is also possible for the housing device to be composed of at least two housing halves in the shape of circle segments, in which case a dividing plane of the housing halves extends in the axial direction. With regard to the disposition of the brushes, each of the housing halves can accommodate at least one brush.

The housing device can form the brush holders and/or the collecting devices. If the housing device is produced by injection-molding, such as from plastic, production of the brush module is particularly cost-effective. In this case, a quiver of the brush holder can simply be formed as a recess in the housing device, and the collecting device can be formed as a simple pocket within the housing device.

The brush holders can be spaced apart from each other in the axial direction with respect to the slip rings; this is possible, in particular, if at least two slip rings are to be electrically connected to one brush each.

Furthermore, at least two brushes for establishing electrical contact with a slip ring may be provided, in which case the respective brush holders can be spaced apart from each other in the radial direction with respect to the slip ring. For example, the two brush holders can be disposed opposite each other in a manner axially symmetric to the slip rings. In this case, the formation of a possible leakage path between the brushes or brush holders is significantly more difficult.

The brush holders can be disposed at maximum relative distance to each other on the housing device. For instance, the brush holders can be spaced apart from each other as far as possible both in the axial direction and in the radial direction based on the design of the housing device.

An alternative brush module according to the invention for a rotating electric machine, in particular for a current-excited synchronous machine, has at least two brushes for establishing electrical contact with slip rings of the machine, the brush module having a housing device and brush holders for accommodating and supporting the brushes, wherein the housing device is configured in such a manner that the brush holders are spaced apart from each other, the housing device at least partially forming an air gap between the brush holders on a housing portion of the housing device that faces toward slip rings.

Accordingly, the brush holders are accommodated in or formed by a shared housing device, the housing device being of such a design that a space is formed between the brush holders. Since the brush dust of the brushes may deposit on the housing portion of the housing device that faces toward the slip rings, in particular, the housing device is designed in such a manner that it forms an air gap between the brush holders on said housing portion. Even if brush dust deposits on the housing portion of the housing device that faces slip rings, the amount of brush dust deposited would have to be great enough for said air gap to be bridged in order for a leakage path to be formed between the brushes or poles. However, the air gap is dimensioned such that it can hardly be filled with or bridged by brush dust. In this way, formation of a leakage path by the brush dust can be prevented through a simple design of the housing device.

The housing device can have a single housing body and simultaneously form the brush holders. In principle, however, the housing device can also be composed of multiple housing bodies, such as one housing body per brush holder.

The air gap can be formed in the housing body and can be ≥5 mm in length. With an air gap of said length, bridging, i.e. formation of a leakage path, by brush dust is virtually precluded. The air gap may be several centimeters long.

The air gap in the housing body can also be formed in such a manner that a width of the air gap is formed as a function of a presumed operating voltage at the brushes. The presumed operating voltage is a maximum operating voltage at the brushes as presumed for regular operation. The width or a minimum width can be easily calculated based on a presumed dielectric strength of 1 kV/mm for air according to standard IEC 60243.

It is particularly advantageous if the brush holder or the brush has a reporting device for wear detection. The reporting device may be in the form of a switch or contact on the brush holder that can detect a length of a brush, or in the form of a contact within the brushes that is triggered by a specific degree of wear.

The electric machine according to the invention, in particular a current-excited synchronous machine, has a brush module according to the invention. Other advantageous embodiments of the electric machine are apparent from the claims dependent on the device claims.

BRIEF DESCRIPTION OF THE DRAWING FIGURE

Hereinafter, preferred embodiments of the invention will be explained in more detail with reference to the accompanying drawings.

FIG. 1 is a cross-section view of a first embodiment of a brush module;

FIG. 2 is a perspective partial view of a second embodiment of a brush module;

FIG. 3 is a cross-section view of the brush module of FIG. 1;

FIG. 4 is a longitudinal-section view of a third embodiment of a brush module;

FIG. 5 is a side view of a fourth embodiment of a brush module.

DETAILED DESCRIPTION OF THE INVENTION

FIG. 1 shows a schematic section view of a brush module 10 on a slip ring 11 of a current-excited synchronous machine. Brush module 10 has two brushes 12 for establishing electrical contact with slip ring 11 and a housing device 13 comprising brush holders 14. Brushes 12 are mounted in brush holders 14 in such a manner that they are mobile in the direction of a longitudinal axis 15 of brush holders 14 and are pushed against slip ring 11 by a spring (not shown), such as a coil spring, a flat spring or a constant force spring. Brush holders 14 are offset from an axis 16 of slip ring 11 by an angle α relative to each other. Housing device 13 is circular ring-shaped and has an outer housing wall 17 which forms an interior 18 which is sealed in a substantially dustproof manner against an environment 19. An opening 20 having a sealing element (not shown) which seals opening 20 is formed in housing wall 17 for the passage of electrical lines (not shown). Collecting devices 21 for collecting brush dust of brushes 12 are formed within housing device 13. The collecting devices are formed by ribs 22, 23, 24 which form pockets 25, 26 and 27, respectively. Ribs 22 to 24 substantially extend in a direction of rotation of slip ring 11, which is indicated by an arrow 28; as can be seen in FIG. 3, brush dust is transported away from brushes 12 in the direction of arrows 29 when slip ring 11 rotates and enters pockets 25, 26 and 27.

As shown in FIG. 2, a brush module 30 can also have a housing device 31 (not shown entirely) which is composed of two housing halves 32. Housing half 32 forms a collecting device 33 in the case at hand.

FIG. 4 shows a brush module 34 having brushes 35 on slip rings 36. Brush module 34 has a housing device 37 which comprises at least two housing halves 38. A quiver 39 which forms a brush holder 41 together with a constant force spring 40 is formed within each housing half 38. Adjacent to brush holder 41, a number of ribs 43, 44 and 45 are formed on a lateral surface 42 of housing half 38, said ribs 43, 44 and 45 forming pockets (not shown) of a collecting device 46 for brush dust. A closing cover of collecting device 46 is not illustrated.

FIG. 5 shows a brush module 47 comprising two brushes 48 and a housing device 49 which forms a housing body 50. Housing body 50 is supported on a fixing tab 51 on a current-excited synchronous machine (not shown). Also, housing body 50 forms two brush holders 52 and 53. An air gap 55 is formed between brush holders 52 and 53 in a housing portion 54 of housing device 49 or of housing body 50 that faces toward a slip ring. Any brush dust that might deposit in the area of brushes 48 cannot bridge a width (B) of air gap 55 or a length (L) of air gap 55, a potential short circuit thus being effectively prevented by air gap 55.

The invention claimed is:

1. A brush module (10, 30, 34) for a rotating electric machine, the brush module having at least two brushes (12, 35) for establishing electrical contact with slip rings (11, 36) of the machine, the brush module having a housing device (13, 31, 37) and brush holders (14, 41) for accommodating and supporting the brushes, characterized in that the housing device has a collecting device (21, 33, 46) for collecting brush dust of the brushes;

wherein the collecting device has pockets for collecting brush dust, the pockets being disposed downstream of the brush in a direction of rotation of a slip ring, the pockets being formed by ribs extending in the direction of the rotation, and each brush is assigned its own collecting device.

2. The brush module according to claim 1, characterized in that the housing device (13, 31, 37) fully surrounds at least the brushes (12, 35).

3. The brush module according to claim 1, characterized in that the housing device (13, 31, 37) is configured to coaxially surround slip rings (11, 36) at least partially.

4. The brush module according to claim 1, characterized in that the housing device (13, 31, 37) is sealed in a dustproof manner against an environment (19).

5. The brush module according to claim 1, characterized in that the collecting device (21, 33, 46) has a material that absorbs brush dust.

6. The brush module according to claim 1, characterized in that the housing device (13, 31, 37) is composed of two circular ring-shaped housing halves (32, 38).

7. The brush module according to claim 1, characterized in that the housing device (13, 31, 37) forms the brush holders (14, 41) and/or the collecting devices (21, 33, 46).

8. The brush module according to claim 1, characterized in that the brush holders (14, 41) are spaced apart in the axial direction with respect to the slip rings (11, 36).

9. The brush module according to claim 1, characterized in that at least two brushes (12, 35) for establishing electrical contact with a slip ring (11, 36) are provided, the respective brush holders (14, 41) being spaced apart in the radial direction with respect to the slip ring.

10. The brush module according to claim 1, characterized in that the brush holders (14, 41) are disposed at a relative distance to each other on the housing device.

11. An electric machine having a brush module (10, 30, 34, 47) according to claim 1.

12. A brush module (47) for a rotating electric machine the brush module having at least two brushes (48) for establishing electrical contact with slip rings of the machine, the brush module having a housing device (49) and brush holders (52, 53) for accommodating and supporting the brushes, characterized in that the housing device is configured in such a manner that the brush holders are spaced apart from each other, the housing device at least partially forming an air gap (55) between the brush holders on a housing portion (54) of the housing device that faces toward slip rings:

wherein the housing device has a single housing body and forms the brush holders, the air gap is formed in the housing body, and a width of the air gap is formed as a function of a presumed operating voltage at the brushes.

13. The brush module according to claim 12, characterized in that the air gap (55) is formed in the housing body (50) and is ≥5 mm in length.

14. The brush module according to claim 12, characterized in that the brush holder (14, 41, 52, 53) or the brush (12, 35, 48) has a reporting device for wear detection.

* * * * *